(12) United States Patent
Hayashi

(10) Patent No.: US 7,411,619 B2
(45) Date of Patent: Aug. 12, 2008

(54) SIGNAL PROCESSING METHOD, A SIGNAL PROCESSOR CIRCUIT, AND IMAGING APPARATUS

(75) Inventor: Kenkichi Hayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 768 days.

(21) Appl. No.: 10/770,501

(22) Filed: Feb. 4, 2004

(65) Prior Publication Data

US 2004/0155972 A1    Aug. 12, 2004

(30) Foreign Application Priority Data

Feb. 5, 2003    (JP)    ............... 2003-028486

(51) Int. Cl.
*H04N 5/202*    (2006.01)
*G06K 9/38*    (2006.01)

(52) U.S. Cl. ............ 348/254; 382/274; 348/255; 348/280

(58) Field of Classification Search ............ 348/241, 348/254, 255, 235, 237, 207.99
See application file for complete search history.

(56) References Cited

U.S. PATENT DOCUMENTS

| | | | | |
|---|---|---|---|---|
| 4,786,968 A | * | 11/1988 | Kutner | .............. 348/674 |
| 4,987,426 A | * | 1/1991 | Ota et al. | .............. 347/253 |
| 5,714,753 A | * | 2/1998 | Park | .............. 250/208.1 |
| 6,181,368 B1 | * | 1/2001 | Takahashi et al. | .............. 348/65 |
| 6,529,640 B1 | * | 3/2003 | Utagawa et al. | .............. 382/284 |
| 6,611,290 B1 | * | 8/2003 | Sato | .............. 348/333.01 |
| 6,677,992 B1 | | 1/2004 | Matsumoto et al. | |
| 6,803,955 B1 | * | 10/2004 | Yosida | .............. 348/272 |
| 2004/0109068 A1 | * | 6/2004 | Mitsunaga et al. | ....... 348/222.1 |

FOREIGN PATENT DOCUMENTS

| | | |
|---|---|---|
| JP | 5-316413 A | 11/1993 |
| JP | 9-37156 A | 2/1997 |
| JP | 11-164195 A | 6/1999 |
| JP | 2000-278598 A | 10/2000 |
| JP | 2001-8104 A | 1/2001 |
| JP | 2001-245130 A | 9/2001 |
| JP | 2002-94999 A | 3/2002 |

* cited by examiner

*Primary Examiner*—Ngoc-Yen T. Vu
*Assistant Examiner*—Christopher K Peterson
(74) *Attorney, Agent, or Firm*—Birch, Stewart, Kolasch & Birch, LLP

(57) ABSTRACT

Providing a signal processing method for image synthesis with reduced computation load, a signal processor circuit for image synthesis with reduced computation load which allows manufacturing at a low production cost, and imaging apparatus which uses the signal processing method and the signal processor circuit. The signal processor circuit includes: a table storage area for storing an LUT; a table overwriting section for overwriting an LUT written into the table storage area with another LUT; and an arithmetic operation section for performing arithmetic operation on a first digital signal or a second digital signal based on the LUT written into the table storage area each time an LUT is written into the table storage area and synthesizing the first digital signal and the second digital signal.

1 Claim, 5 Drawing Sheets

SIGNAL PROCESSING METHOD, A SIGNAL PROCESSOR CIRCUIT, AND IMAGING APPARATUS

This Non-provisional application claims priority under 35 U.S.C § 119(a) on patent application Ser. No(s). 2003-028486 filed in Japan on Feb. 5, 2003, the entire contents of which are hereby incorporated by reference.

A signal processing method, a signal processor circuit, and imaging apparatus

BACKGROUND OF THE INVENTION

1. Field of the Invention

The present invention relates to a signal processing method, a signal processor circuit, and imaging apparatus, and in particular to imaging apparatus such as a digital camera and a digital video camera equipped with an image pickup device capable of outputting a high-sensitivity signal and a low-sensitivity signal, and a signal processor circuit and a signal processing method therefor.

2. Description of the Related Art

In general, imaging apparatus such as a digital camera and a digital video camera has a specific dynamic range determined by the electric charge storage capacity of a built-in image pickup device. The dynamic range of the image pickup device is narrower than the dynamic range of a silver halide negative film obtained by using a camera which employs a silver halide film.

Thus, in case a scene is to be imaged where a very bright (high-luminance) subject and a relatively dark (low-luminance) subject are present, such as photographing an exterior from an interior, the exposure time is controlled so that wither the high-luminance subject or low-luminance subject is will be exposed at an appropriate level. Under such control, setting the luminance level of the low-luminance subject as an appropriate exposure level may result in overexposure of the high-luminance region. Setting the luminance level of the high-luminance subject as an appropriate exposure level may result in underexposure of the low-luminance region. This obtains only an inappropriate image.

In order to solve these problems, imaging apparatus has been developed which acquires two types of image signals or picture signals, that is, a high-sensitivity image or picture signal and a low-sensitivity image or picture signal each having a dynamic range different from each other and optimizes to synthesize the two types of image signals, thereby obtaining a signal having a wide dynamic range. Such imaging apparatus is disclosed for example in the Japanese Patent Laid-Open No. 2001-94999 and the Japanese Patent Laid-Open No. 2001-8104.

The Japanese Patent Laid-Open No. 2001-94999 discloses imaging apparatus which appropriately regulates a standard-luminance picture signal obtained so that a subject of a standard luminance will be at an appropriate level and a high-luminance picture signal obtained so that a subject of a luminance higher than the standard will be at an appropriate level and synthesizes both signals, thereby obtaining a wide dynamic range picture signal.

The Japanese Patent Laid-Open No. 2001-8104 discloses imaging apparatus which uses imaging means capable of acquiring both a low-sensitivity signal and a high-sensitivity signal to take a low-sensitivity picture and a high-sensitivity picture and synthesizes both signals, thereby obtaining a wide dynamic range picture signal.

On the imaging apparatus described in the Japanese Patent Laid-Open No. 2001-94999, it is necessary, during a signal synthesis process, to change the weight of a signal to be adaptively synthesized in accordance with the level of imaging data. Uniform signal synthesis for every scene would result in degraded picture quality depending on the scene. Thus, it is desirable to limit the dynamic range depending on the scene based on for example the information on the contrast of the subject, and the signal synthesis for this approach will require complicated arithmetic operation. This presents a need to design a complicated signal processor circuit for performing complicated arithmetic operation, which increase the overall cost.

On the imaging apparatus described in the Japanese Patent Laid-Open No. 2001-8104, optimization of individual images to be synthesized is required in order to perform signal synthesis and obtain a wide dynamic range picture signal. However, simultaneous optimization of the individual images requires as many optimization circuits for performing processing such as correction of gray-scale levels as the number of images to be synthesized. This increases the circuit scale and complicates the circuit design, which further increases the overall cost.

In case a correction signal for gray-scale correction is generated and gray-scale correction is made in each optimization circuit then synthesis of images is performed in a synthesis circuit, the signal processor circuit undergoes a large computation load thus increasing the processing time.

SUMMARY OF THE INVENTION

The invention has been accomplished in view of the aforementioned problems. It is an object of the invention to provide a signal processing method for image synthesis with reduced computation load, a signal processor circuit for image synthesis with reduced computation load which allows manufacturing at a low production cost, and imaging apparatus which uses the signal processor circuit.

In order to attain the object, a signal processing method according to the first aspect of the invention is characterized by comprising: an overwriting step of overwriting an LUT written into a table storage area in accordance with the content of each of a plurality of processes executed on a first signal or a second signal; and a synthesizing step of performing a process corresponding to the content of the overwritten LUT each time the content of the LUT in the table storage area is overwritten and synthesizing the first digital signal and the second digital signal.

According to the aspect, the data written into the table storage area is overwritten in correspondence to a process. Thus, it is not necessary to previously provide a plurality of table storage areas for storing LUTs corresponding to a plurality of processes, so that it is necessary to provide a storage area for LUTs alone having a maximum data amount as data capacity of a table storage area. Thus it is possible to perform signal synthesis while saving the size of the data area in the table storage area.

A signal processing method according to the second aspect of the invention is the signal processing method according to the first aspect, characterized in that the synthesizing step comprises: a step of writing a first LUT for gray-scale correction of the first signal: into the table storage area; a step of performing gray-scale correction on the first signal by using the first LUT for gray-scale correction written into the table storage area; a step of overwriting the table storage area where the first LUT for gray-scale correction is written with the second LUT for gray-scale correction of the second signal; a step of performing gray-scale correction on the second signal by using the second LUT for gray-scale correction written into the table storage area; a step of overwriting the table storage area where the second LUT for gray-scale correction is written with a weighting LUT for signal synthesis; and a step of synthesizing the first signal and the second signal by using the weighting LUT for signal synthesis written into the table storage area.

According to the aspect, it is possible to store the first LUT for gray-scale correction, second LUT for gray-scale correction and weighting LUT in the table storage area in accordance with various processes and synthesize a signal from the first signal and the second signal. In this aspect also, the data written into the table storage area is overwritten in correspondence to a process. Thus, it is not necessary to previously provide a plurality of table storage areas for storing LUTs corresponding to a plurality of processes, so that it is necessary to provide a storage area for LUTs alone having a maximum data amount as data capacity of a table storage area. Thus it is possible to perform signal synthesis while saving the size of the data area in the table storage area.

A signal processor circuit according to the third aspect of the invention is characterized by comprising: a table storage area for storing an LUT; table overwriting means for overwriting an LUT written into the table storage area with another LUT; and arithmetic operation means for performing arithmetic operation on a first digital signal or a second digital signal based on the LUT written into the table storage area each time an LUT is written into the table storage area and synthesizing the first digital signal and the second digital signal.

According to the aspect, the data written into the table storage area is overwritten in correspondence to a process. Thus, it is not necessary to previously provide a plurality of table storage areas for storing LUTs corresponding to a plurality of processes, so that it is necessary to provide a storage area for LUTs alone having a maximum data amount as data capacity of a table storage area. Thus it is possible to perform signal synthesis while saving the size of the data area in the table storage area.

A signal processor circuit according to the fourth aspect of the invention is the signal processor circuit according to the third aspect, characterized in that the arithmetic operation means performs gray-scale correction on the first digital signal by using an LUT for gray-scale correction of the first digital signal written into the table storage area, performs gray-scale correction on the second signal by using an LUT for gray-scale correction of the second digital signal written into the table storage area, and synthesizes the first digital signal and the second digital signal by using a weighting LUT for signal synthesis written into the table storage area.

According to the aspect, the table overwriting means stores the first LUT for gray-scale correction, second LUT for gray-scale correction and the weighting LUT in accordance with various processes, and the synthesizing means synthesizes a signal from the first signal and the second signal. In this aspect also, the data written into the table storage area is overwritten in correspondence to a process. Thus, it is not necessary to previously provide a plurality of table storage areas for storing LUTs corresponding to a plurality of processes, so that it is necessary to provide a storage area for LUTs alone having a maximum data amount as data capacity of a table storage area. Thus it is possible to perform signal synthesis while saving the size of the data area in the table storage area.

Imaging apparatus according to the fifth aspect of the invention comprises: image pickup means including a plurality of first photoreceptor devices and second photoreceptor devices respectively having a first photoreceptive area and a second photoreceptive area having different sensitivities; an A/D converter circuit for performing A/D conversion on a first analog signal including a plurality of output signals output from the first photoreceptor devices and a second analog signal including a plurality of output signals output from the second photoreceptor devices to generate a first digital signal and a second digital signal; and a signal processor circuit for performing a plurality of processes on the first digital signal and the second digital signal to generate image data; characterized in that the signal processor circuit comprises; a table storage area for storing an LUT; table overwriting means for overwriting an LUT written into the table storage area with another LUT; and arithmetic operation means for performing arithmetic operation on a first digital signal or a second digital signal based on the LUT written into the table storage area each time an LUT is written into the table storage area and synthesizing the first digital signal and the second digital signal.

According to the aspect, the data written into the table storage area is overwritten in correspondence to a process. Thus, it is not necessary to previously provide a plurality of table storage areas for storing LUTs corresponding to a plurality of processes, so that it is necessary to provide a storage area for LUTs alone having a maximum data amount as data capacity of a table storage area. Thus it is possible to perform signal synthesis while saving the size of the data area in the table storage area. As a result, it is possible to save the circuit space in imaging apparatus to provide a compact digital camera.

Imaging apparatus according to the sixth aspect of the invention is the imaging apparatus according to the fifth aspect, comprising a controller for generating the LUT based on the first digital signal or the second digital signal and a memory for storing the LUT generated by the controller, characterized in that the table overwriting means writes the LUT stored in the memory into the table storage area.

According to the aspect, an LUT is generated by a controller external to the signal processor circuit, and arithmetic operation is performed in the signal processor circuit by using the generated LUT. Thus it is not necessary to generate an LUT in the signal processor circuit, which reduces the processing load on the signal processor circuit thereby speeding up the overall processing.

Imaging apparatus according to the seventh aspect of the invention is the imaging apparatus according to the fifth or sixth aspect, characterized in that the LUTs are an LUT for gray-scale correction of the first digital signal, an LUT for gray-scale correction of the second digital signal and a weighting LUT for signal synthesis.

According to the aspect, signal synthesis is performed by overwriting the LUT for gray-scale correction of the first digital signal, the LUT for gray-scale correction of the second digital signal and the weighting LUT for signal synthesis.

Imaging apparatus according to the eighth aspect of the invention is the imaging apparatus according to the seventh aspect, characterized in that the signal processor circuit performs gray-scale correction on the first digital signal by using an LUT for gray-scale correction of the first digital signal written into the table storage area, performs gray-scale correction on the second signal by using an LUT for gray-scale correction of the second digital signal written into the table storage area, and synthesizes the first digital signal and the second digital signal by using the weighting LUT for signal synthesis written into the table storage area.

According to the aspect, gray-scale correction is performed based on the LUT for gray-scale correction of the first digital signal, the LUT for gray-scale correction of the second digital signal and the weighting LUT then signal synthesis is performed. The synthesizing process synthesizes a signal from the first digital signal and the second digital signal. In this aspect also, the data written into the table storage area is overwritten in correspondence to a process. Thus, it is not necessary to previously provide a plurality of table storage areas for storing LUTs corresponding to a plurality of processes, so that it is necessary to provide a storage area for LUTs alone having a maximum data amount as data capacity of a table storage area. Thus it is possible to perform signal synthesis while saving the size of the data area in the table storage area.

DESCRIPTION OF THE PREFFERED OF THE EMBODIMENTS

A digital camera as an example of imaging apparatus according to embodiment of the invention will be detailed referring to drawings.

Figure 1:
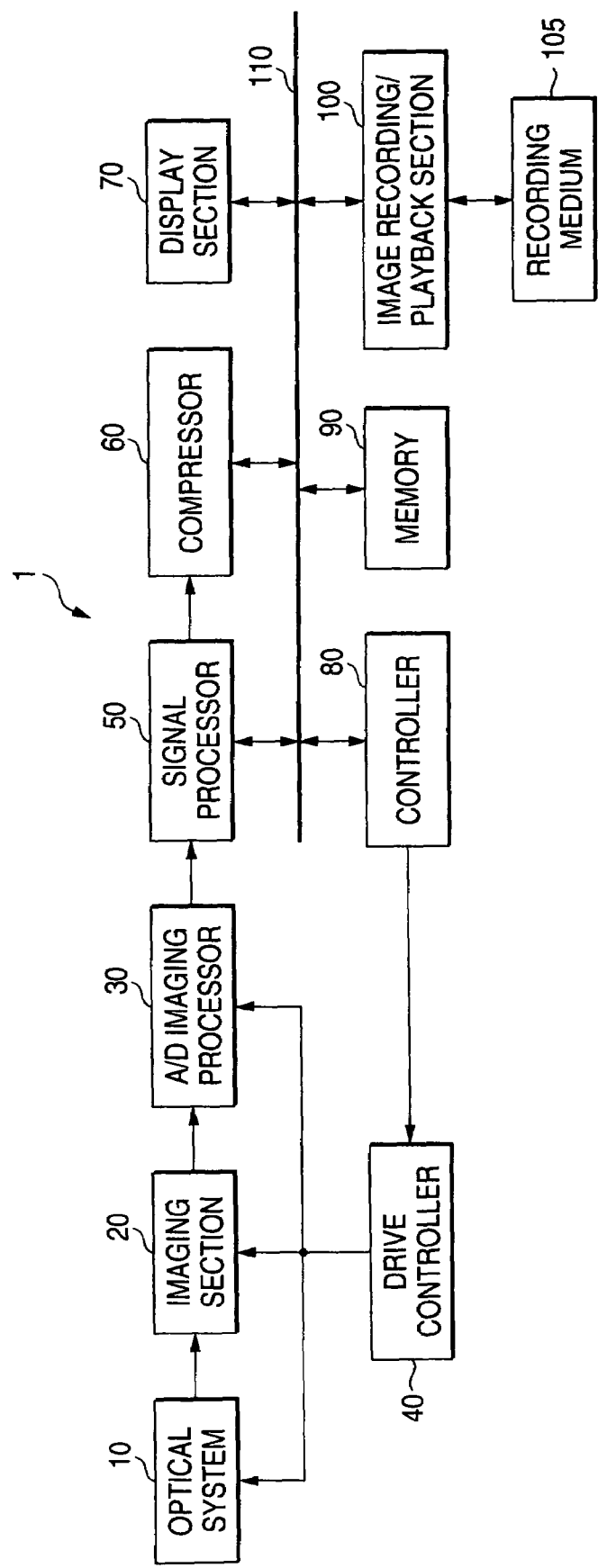
FIG. 1 is a block diagram showing a digital camera according to this embodiment.

FIG. 1 is a block diagram showing a digital camera 1 according to this embodiment. The digital camera 1 comprises an optical system 10, an imaging section 20, an A/D imaging processor 30, a drive controller 40, a signal processor 50, a compressor 60, a display section 70, a controller 80, a memory 90, and an image recording/playback section 100.

The optical system 10 comprises a unifocal lens including a single lens or a combination of a plurality of lenses on which an external light is incident, a lens such as a zoom lens, and a diaphragm to limit the light quantity from outside. The optical system 10 is a convergence member which focuses an incident light from outside onto an image pickup device on the imaging section 20 in the subsequent stage. In the optical system 10, focusing in accordance with the distance between a subject and a camera or adjustment of angle of view through zooming is made under the control of a drive signal from the drive controller 40.

The imaging section 20 is arranged in the subsequent stage of the optical system 10 and performs photoelectric conversion on a light incident on the digital camera 1 via the optical system 10 for each position of incidence and draws the resulting signal as an electric signal. In this embodiment, the imaging section 20 comprises a solid-state image pickup device 21 and is capable of acquiring two types of signals having different sensitivities with single imaging practice.

Figure 2:
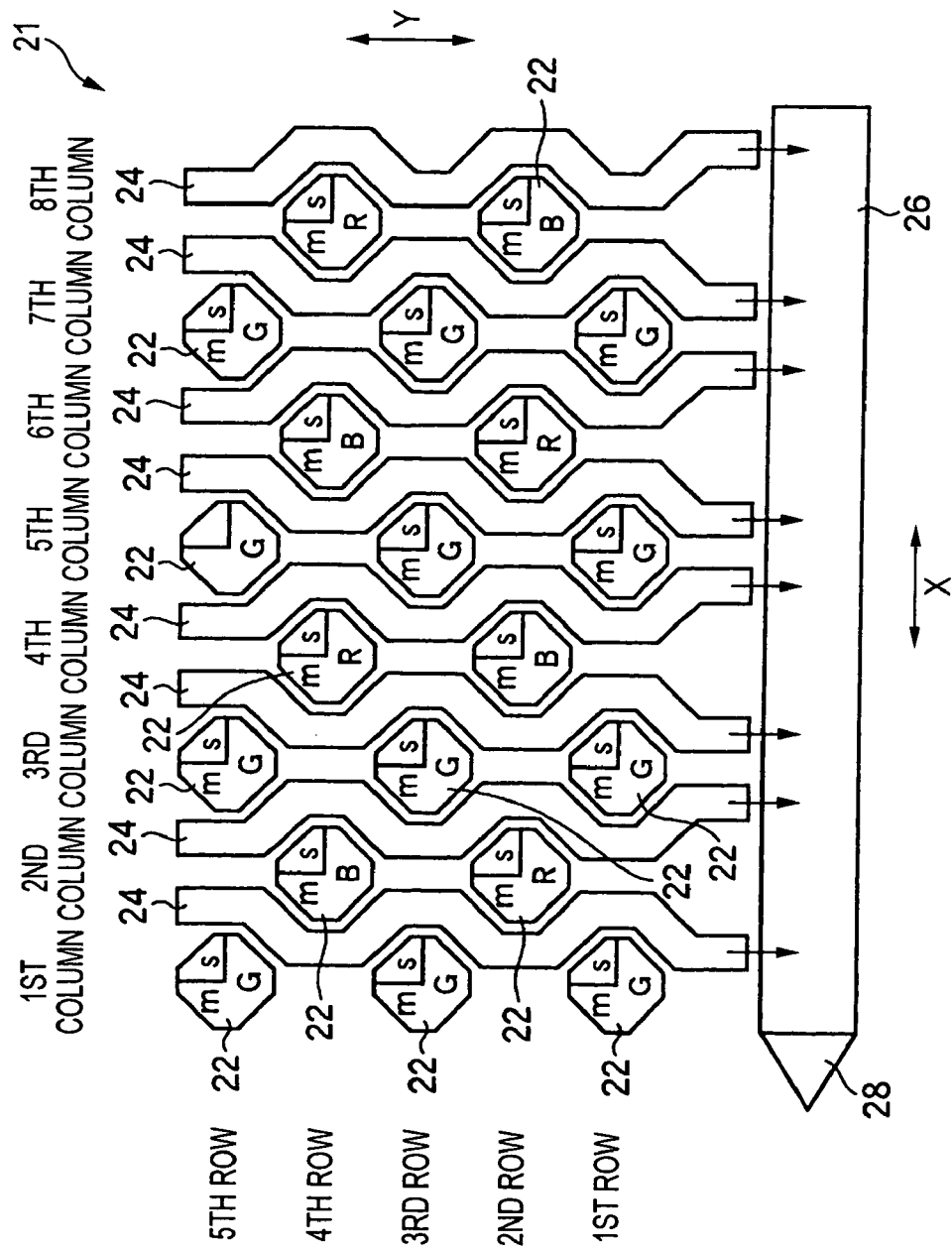
FIG. 2 is a partial enlarged plan view of a solid-state image pickup device.

FIG. 2 is a partial enlarged plan view of the solid-state image pickup device 21. The solid-state image pickup device 21 is a solid-state image pickup device of a so-called "honeycomb arrangement" and includes a plurality of photoreceptor devices 22 (the numeral is given to some of the devices only) arranged in the direction of row (direction shown by an arrow X) and the direction of column orthogonal thereto (direction shown by an arrow Y) on the surface of a semiconductor substrate, a vertical transfer section 24, a horizontal transfer section 26, and an output section 28. The photoreceptor devices on the odd-numbered columns out of the plurality of photoreceptor devices 22 are dislocated by approximately half the pitch between adjacent photoreceptor devices in the direction of column with respect to those in the even-numbered columns. The photoreceptor devices on the odd-numbered rows out of the plurality of photoreceptor devices 22 are dislocated by approximately half the pitch between adjacent photoreceptor devices in the direction of row with respect to those in the even-numbered columns. While FIG. 2 shows photoreceptor devices on five rows and eight columns, more photoreceptor devices are provided in reality.

The photoreceptor device 22 generates and accumulates a signal charge corresponding to the amount of incident light and is for example a photodiode. Each photoreceptor device 22 comprises a main region m having a relatively wide photoreceptive area and a sub-region s having a relatively narrow photoreceptive area. Each of the main region m and the sub-region s generates and accumulates a signal charge corresponding to a light of predetermined spectral sensitivity. The sub-region s has a lower photoreceptive sensitivity than that of the main region m and accumulates smaller amount of signal charge than that of the main region m.

Above each photoreceptor device 22 are provided any one of a red color filter (R), green color filter (G) and blue color filter (B) which are not shown. The main region m and the sub-region s in the same photoreceptor device 22 are provided with the same color filter. The photoreceptive regions m, s in the photoreceptor device 22 each generates and accumulates a signal charge corresponding to the light of each color.

The vertical transfer section 24 reads a signal charge from each photoreceptor device 22 and transfers the signal charge in the direction of column. The vertical transfer sections 24 are provided laterally on both sides of each column of photoreceptor devices 22. The vertical transfer section 24 separately reads the signal charge of the main region m and the signal charge of the sub-region s in the direction of column and transfers the signal charges to the horizontal transfer section 26. The horizontal transfer section 26 receives signal charges transferred from a plurality of vertical transfer sections 24 and transfers the received signal charges in the direction of row. The output section 400 outputs a voltage signal corresponding to the amount of the signal charge transferred from the vertical transfer section 26. Hereinafter, a plurality of voltage signals generated based on a plurality of charge signals from a plurality of main regions m are called a high-sensitivity signal H. A plurality of voltage signals generated based on a plurality of charge signals from a plurality of sub-regions s are called a low-sensitivity signal L. The high-sensitivity signal H and the low-sensitivity signal L are sent to the A/D imaging processor 30.

The A/D imaging processor 30 performs predetermined analog signal processing such as bias adjustment and gain adjustment on the high-sensitivity signal H and the low-sensitivity signal L and performs A/D conversion to obtain digital signals. The high-sensitivity signal H and the low-sensitivity signal L are individually converted to digital signals in 12-bit gray scale, and a high-sensitivity digital signal Ha and a low-sensitivity digital signal La are generated respectively. The high-sensitivity digital signal Ha and the low-sensitivity digital signal La thus generated are sent to the signal processor 50.

The drive controller 40 outputs a drive signal for the lens of the optical system 10, a transfer timing signal for transferring a charge signal generated by the imaging section 20, and a drive timing for the A/D imaging processor 30 in order to make centralized control over these sections, based on an instruction from the controller 80. In the focus control and imaging control, a drive timing is determined by the drive controller 40 based on an instruction from the controller, and the signals generated after imaging are sequentially sent to the signal processor 50.

The signal processor 50 performs optimization of the high-sensitivity digital signal Ha and a low-sensitivity digital signal La and synthesizes the high-sensitivity digital signal Ha and a low-sensitivity digital signal La thus optimized to generate image data. The signal processor 50 is connected to the bus 110. The image data generated is recorded onto a recording medium 105 connected to the image recording/playback section 100 via the compressor 60 or bus 110. The signal processor 50 will be detailed later.

The compressor 60 is connected to a bus line 110. The compressor 60 compresses the image data generated by the signal processor in accordance with a predetermined image format such as TIFF and JPEG and varies the data amount of the image data. Whether data compression is to be made depends on the user setting. In case data compression is not to be made, image data may be written into the recording medium 105 from the signal processor 50.

The display section 70 is also connected to the bus line 110 and has a display made of a material such as a liquid crystal. The display section 70 displays an image of a subject acquired before imaging or image data after imaging is over, or presents setting of digital camera to the user on this display.

The controller 80 comprises a CPU which performs high-speed arithmetic operation. The controller 80 performs various arithmetic operations based on an imaging instruction from a shutter button (not shown) and performs centralized control over the imaging operation of the digital camera 1. During an imaging process, the controller 80 performs auto-focus control, automatic exposure control and automatic white balance adjustment as well as part of specific control such as assistance in arithmetic operation by each section as required.

The memory 90 is built-in recording means for storing various set values of the digital camera and temporarily recording the arithmetic operation results of each section. The sections of the digital camera exchange data via memory as required.

To the image recording/playback section 100, an external recording medium 105 such as Smartmedia and xD-Picture Card may be connected. The image data generated is recorded onto this external recording medium 105 for storage. During playback of an image, the image recording/playback section 100 reads data from the external recording medium 105 and outputs the data on the display section 70 to display the corresponding image on the display of the display section 70.

Figure 3:
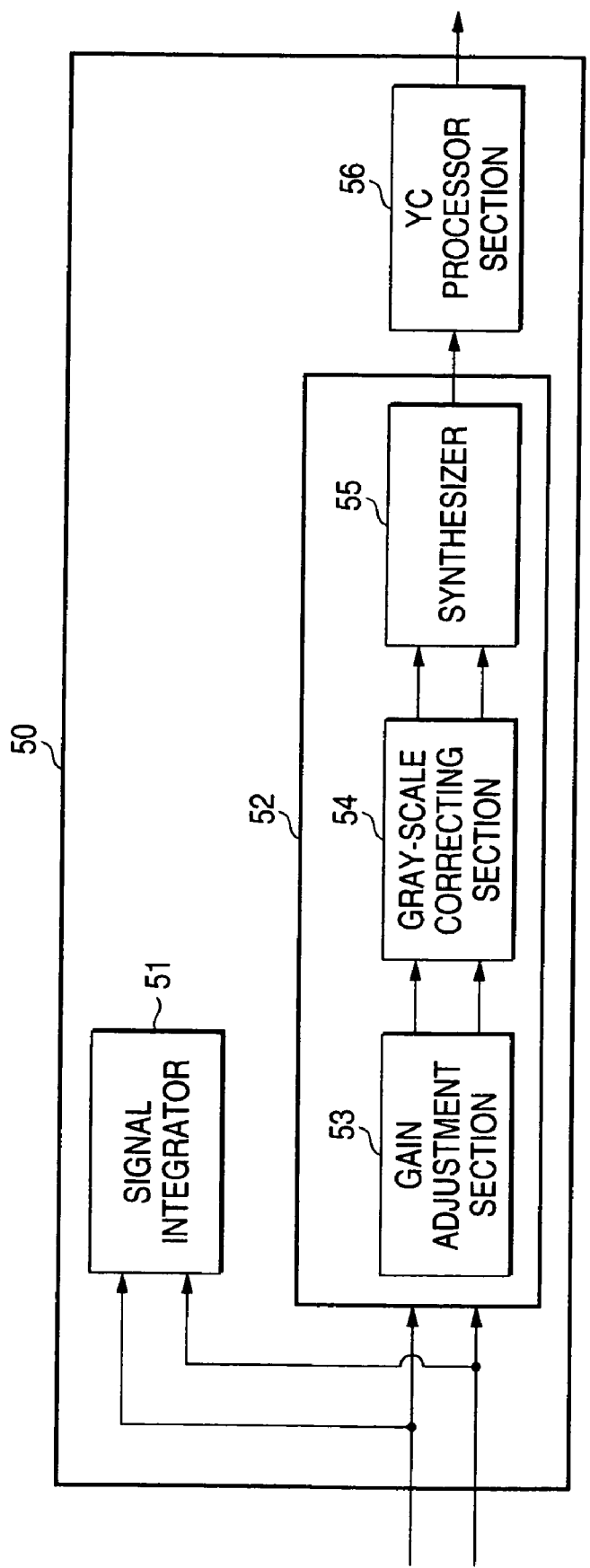
FIG. 3 is a block diagram showing the details of the processing in a signal processor.

FIG. 3 is a block diagram showing the details of the processing in the signal processor 50. The signal processor 50 comprises a signal integrator 51, a gain adjustment section 53, a gray-scale correcting section 54, a synthesizer 55, and a YC processor circuit 56. Both of a high-sensitivity digital signal Ha and a low-sensitivity digital signal La input to the signal processor 50 are sent to the signal integrator 51 and the gain adjustment section 53.

The signal integrator 51 sums up a high-sensitivity digital signal Ha and a low-sensitivity digital signal La per color of R, G, B and calculates the histogram by color and a mean integral value by color. In calculation, the screen area of the image obtained may be split into a plurality of areas and a mean integral value may be obtained for each area.

The gain adjustment section 53 is a multiplication circuit for performing gain adjustment such as white balance adjustment of a digital signal. The white balance adjustment is a process whereby a color balance is corrected in accordance with the coloration (color temperature) of a light source. Generally speaking, in case white balance adjustment is skipped, an image obtained is likely to be greenish under a fluorescent lamp and one obtained is likely to be reddish under an incandescent lamp due to a difference in the color temperature.

In actual while balance control, the gain adjustment section 53 calculates a ratio of Gsum to other signals Rsum, Bsum, or Rsum/Gsum and Bsum/Gsum based on the mean integral values Rsum, Gsum, Bsum for the R, G, B signals obtained by the signal integrator 51 concerning the high-sensitivity digital signal Ha. Color levels of R, G, B signals are adjusted by multiplying the R, B signals by a gain correction factor for each color calculated in accordance with the ratio obtained. In this example, the R, G signals of the high-sensitivity digital signal Ha and the R, G signals of the low-sensitivity digital signal La are multiplied by the gain correction factor obtained from the high-sensitivity digital signal Ha to adjust the white balance of the digital signals Ha, La.

The gray-scale correcting section 54 performs gray-scale correction on the high-sensitivity digital signal Ha and the low-sensitivity digital signal La obtained after gain adjustment independently from 12-bit data to 8-bit data by using predetermined factors. The gray-scale conversion uses a matrix format LUT for gray-scale correction of a high-sensitivity digital signal and a matrix format LUT for gray-scale correction of a low-sensitivity digital signal. On input of a high-sensitivity digital signal Ha and a low-sensitivity digital signal La, each LUT for gray-scale correction outputs data in accordance with the signal value and performs gray-scale conversion. These LUTs for gray-scale correction may be previously stored into the memory area of the controller 80 or the memory 90, or may be adaptively obtained through arithmetic operation which is based on the user setting or histogram of a digital signal.

The synthesizer 55 synthesizes the high-sensitivity digital signal Hb obtained after gray-scale correction and the low-sensitivity digital signal Lb obtained after gray-scale correction per R, G and B signal to generate a synthetic digital signal S comprising the R signal, G signal and B signal. In this particular example, the following expression is used to perform synthesis.

$$S = (Hb + \text{MIN}(Hb/th, 1) \times \text{MAX}(-0.2Hb/th + 1, p) \quad (1)$$
$$= (Hb \cdot W1 \cdot Lb) \cdot W1$$
$$= Wt \cdot Hb + Wt \cdot W1 \cdot Lb$$
$$= \text{h\_gain} \cdot Hb + \text{l\_gain} \cdot Lb$$

$$\text{h\_gain} = Wt = \text{MAX}(-0.2Hb/th+1,p) \quad (2)$$

$$\text{l\_gain} = Wt \cdot W1 = \text{MAX}(-0.2Hb/th+1,p) \times \text{MIN}(Hb/th,1) \quad (3)$$

In the expressions (1), (2) and (3), the parameter p is a gain with respect to the entire digital signal obtained through addition. The parameter p is used to control the dynamic range on the data obtained after addition. The smaller the value is, the wider the dynamic range becomes. The larger the value is, the narrower the dynamic range becomes. To be more precise, the value is set to 0.8 for a high-contrast scene such as a clear day in midsummer, 0.86 on a cloudy day or in the shade, or 0.9 under a fluorescent lamp in a room so as to effectively use the 8-bit gray-scale value.

The parameter th represents the ratio of the amount of the low-sensitivity digital signal Lb mixed into the high-sensitivity digital signal Hb to the amount of the signal Hb. The parameter th may be previously determined in accordance with the signal strengths of the high-sensitivity digital signal Hb and the low-sensitivity digital signal Lb. In the actual synthesis process, the high-sensitivity digital signal Hb, the parameters th, p, and h_gain and l_gain determined in accordance with the expressions (2) and (3) are calculated. Then the high-sensitivity digital signal Hb and the low-sensitivity digital signal Lb are multiplied by h_gain and l_gain respectively and the resulting signals are summed up to generate the synthetic signal S. As an example., the parameter th can be fixed while the parameter p can be variably set according to the scene in the actual process.

Once the parameters p and th are determined in accordance with the mode setting and imaging conditions, the controller 80 previously generates a matrix format weighting LUT for signal synthesis which stores h_gain and l_gain. The LUT, in response to the input of Hb, outputs h_gain and l_gain in accordance with the value of Hb. The LUT is read into a predetermined table storage area and used during signal synthesis. The table storage area where this weighting LUT for signal synthesis is stored is the same as the area where the LUT for gray-scale correction of a high-sensitivity digital signal and the LUT for gray-scale correction of a low-sensitivity digital signal. The detailed description will be given later.

The YC processor circuit 56 is a circuit which performs predetermined coincidence processing and generates a luminance signal Y and chroma signals Cr, Cb from the R signal, G signal and B signal of the synthetic signal S. The YC processor circuit 56 performs various processes such as noise reduction on the generated luminance signal. Y and chroma signals Cr, Cb to generate non-compressed image data. The generated image data is compressed by the compressor 60 before it is sent to the image recording/playback section 100, or in case it is not compressed, it is directly sent to the image recording/playback section 100. After that, the image data is recorded onto the recording medium 105.

As mentioned above, in the processing by the signal processor shown in FIG. 3, a series of processes in the gain adjustment section 53, the gray-scale correcting section 54 and the synthesizer 55 is made in a single optimum synthesis circuit 52. The optimum synthesis circuit 52 and the processing made therein will be described.

Figure 4:
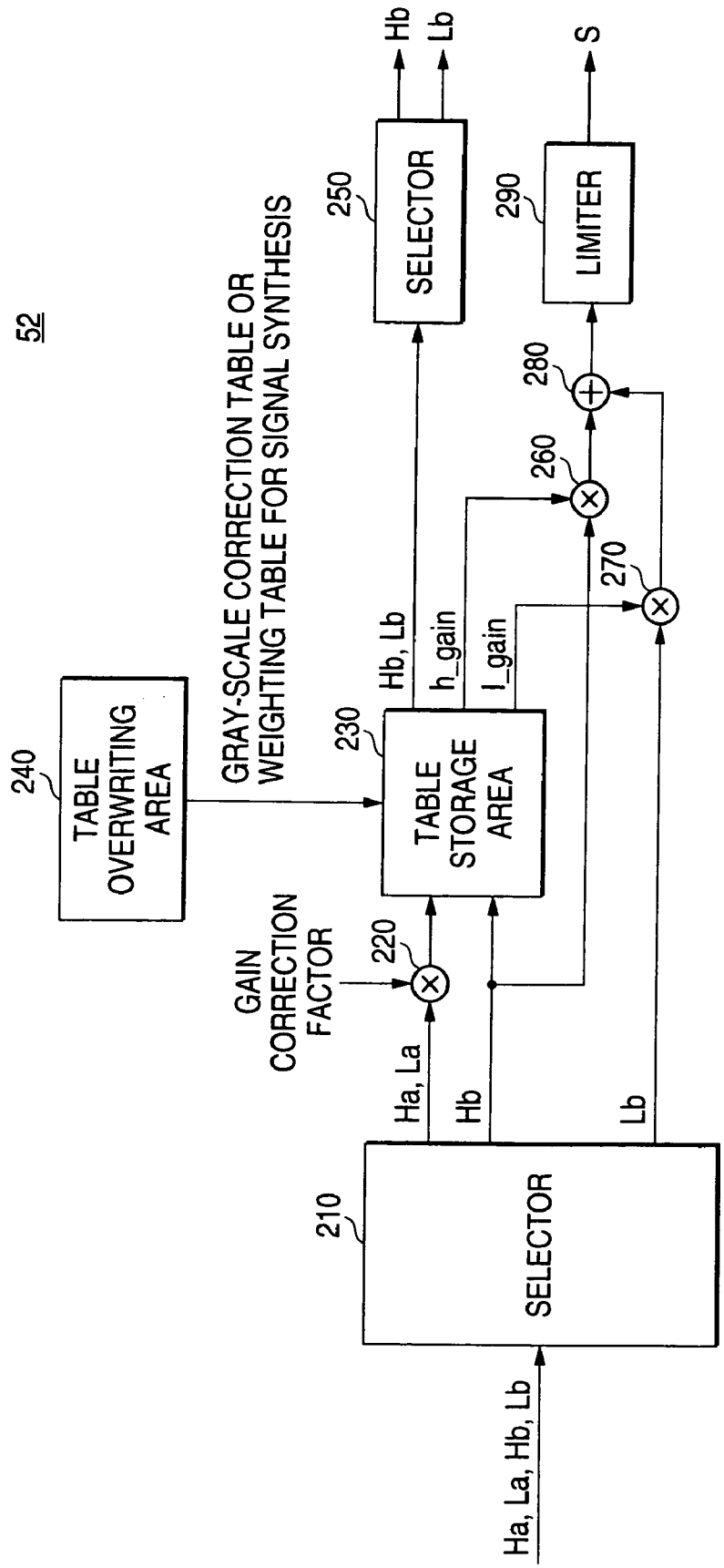
FIG. 4 is a block diagram showing the configuration of an optimum synthesis circuit.

FIG. 4 is a block diagram showing the configuration of the optimum synthesis circuit 52. The optimum synthesis circuit 52 is characterized in that a table storage area 230 for storing an LUT for gray-scale correction of a high-sensitivity digital signal, an LUT for gray-scale correction of a low-sensitivity digital signal and a weighting LUT for signal synthesis are shared by the gray-scale correcting section and the synthesizer. The blocks of the optimum synthesis circuit 52 are described below.

A selector 210 provided at the input port of the optimum synthesis circuit 52 distributes the digital signals Ha, La, Hb, Lb input to the optimum synthesis circuit 52 in accordance with the type of signal.

A multiplier 220 is a block corresponding to the gain adjustment section 53 in FIG. 3 which multiplies the digital signals Ha, La by a gain correction factor for white balance and outputs the resulting signals. To be specific, the selector 210 sequentially outputs the high-sensitivity digital signal Ha and the low-sensitivity digital signal La to the multiplier 220. The multiplier 220 multiplies the received high-sensitivity digital signal Ha and low-sensitivity digital signal La by the gain correction factor to perform gain adjustment and outputs the resulting signals to the table storage area 230 in the subsequent stage.

The table storage area 230 stores one of an LUT for gray-scale correction of a high-sensitivity digital signal, an LUT for gray-scale correction of a low-sensitivity digital signal and a weighting LUT for signal synthesis at a time. Thus the table storage area 230 serves as the gray-scale correcting section 54 or the synthesis gain output section of the synthesizer 55. To be specific, the table storage area 230 is allocated a memory area to store one of the above LUTs at a time. In case a new LUT is written into the table storage area 230, the LUT present in the table storage area 230 is overwritten with the new LUT. The table storage area 230 stores only the LUT corresponding to necessary processing; it performs the processing corresponding to the written LUT on an input signal.

A table overwriting section 240 selects an LUT to be stored into the table storage area 230 and writes the LUT into the table storage area 230. An LUT for gray-scale correction of a high-sensitivity digital signal, an LUT for gray-scale correction of a low-sensitivity digital signal and a weighting LUT for signal synthesis are previously generated outside the signal processor 50, or in the controller 80, and stored into the memory 90 or in the memory area of the controller 80, in case arithmetic operation is required. The table overwriting section 240 reads a necessary LUT from the memory 90 as required and overwrites the table storage area with the LUT.

In summary, the processing in the table storage area 230 includes two types of gray-scale correction and output of the gain for signal synthesis h_gain and l_gain. In case a high-sensitivity digital signal Ha after gain adjustment or low-sensitivity digital signal La after gain adjustment is to be input to the table storage area 230, the table overwriting section 240 previously writes an LUT for gray-scale correction of a high-sensitivity digital signal or an LUT for gray-scale correction of a low-sensitivity digital signal into the table storage area 230. The table overwriting section 240 then references the LUT for gray-scale correction of a high-sensitivity digital signal or the LUT for gray-scale correction of a low-sensitivity digital signal to perform gray-scale correction on the digital signal Ha or La, and outputs the gray-scale-corrected digital signal Hb or Lb to a selector 250.

In case a gray-scale-corrected digital signal Hb is input to the table storage area 230, the table storage area 230 outputs h_gain and l_gain written into the weighting LUT for signal synthesis in accordance with the signal level of Hb.

The selector 250 identifies the digital signals Hb and Lb and temporarily stores the digital signals Hb and Lb into the external memory 90. The digital signals Hb and Lb stored into the memory 90 are input to the optimum synthesis circuit 52 before they undergo signal synthesis.

Multipliers 260, 270 are circuits for multiplying a high-sensitivity digital signal Hb and a low-sensitivity digital signal Lb obtained after gray-scale conversion by the weighting factors h_gain and l _gain, respectively. The high-sensitivity digital signal Hb and the low-sensitivity digital signal Lb which have undergone multiplication in the multipliers 260, 270 are summed up in an adder 280 to generate a synthesis signal S. The synthesis signal S output from the adder 280 is checked for an overflow by a limiter 290, then output as a final synthesis signal S from the optimum synthesis circuit 52 to the YC processor circuit 56.

Figure 5:
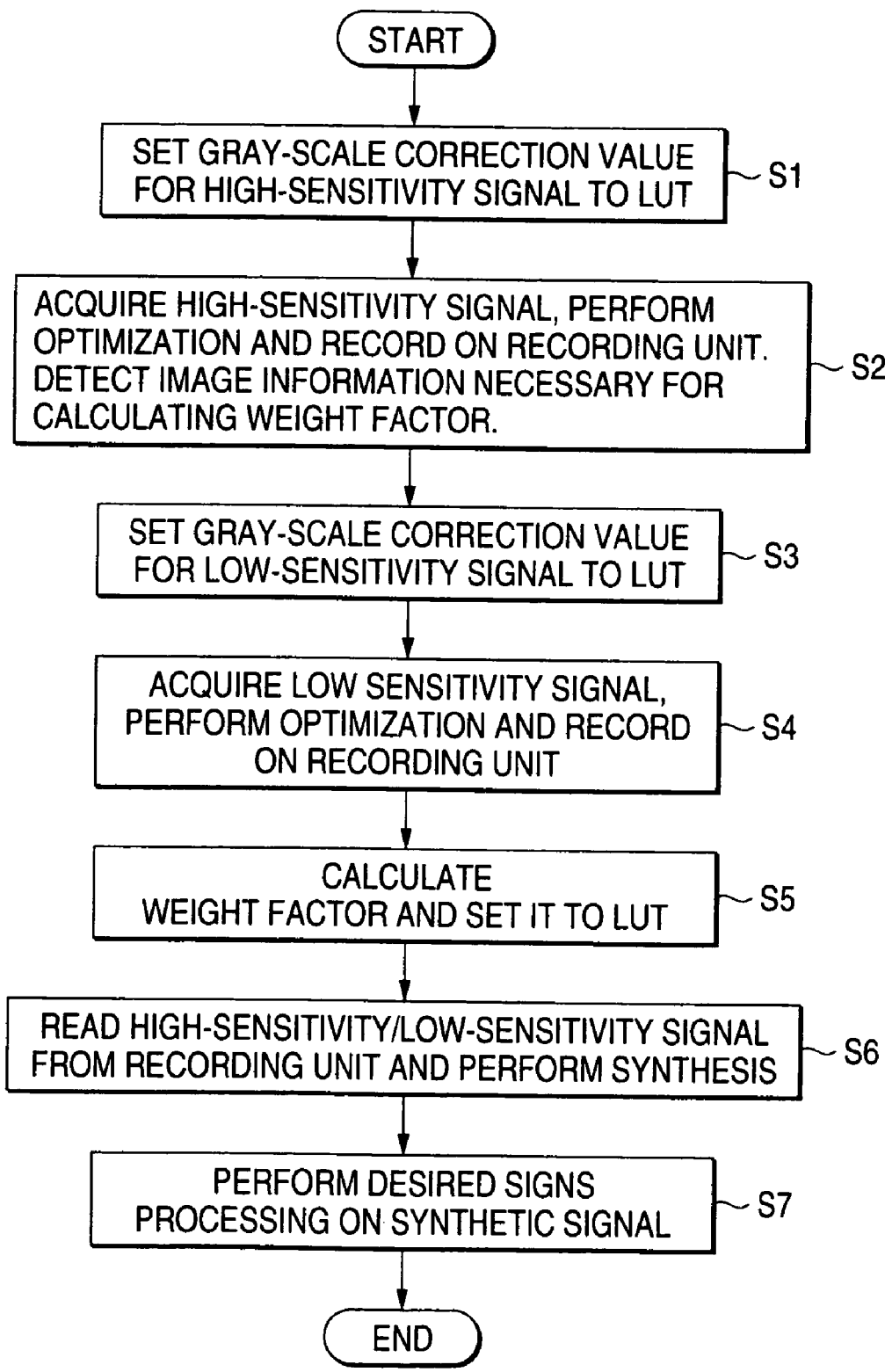
FIG. 5 is a flowchart showing the signal synthesis.

The flow of signals and signal synthesis in the optimum synthesis circuit 52 will be described referring to FIG. 5. When imaging is made and two types of digital data are generated, the controller 80 generates a gain adjustment factor, an LUT for gray-scale correction of a high-sensitivity digital signal and an LUT for gray-scale correction of a low-sensitivity digital signal and stores them in the memory 90 as preprocessing. The table overwriting section 240 reads the LUT for gray-scale correction of a high-sensitivity digital signal from the memory 90 and writes the LUT for gray-scale correction of a high-sensitivity digital signal into the table storage area 230 (step S1). The high-sensitivity digital signal Ha is sent to the multiplier 220 via the selector 210 and multiplied by a gain correction factor to undergo gain adjustment in the multiplier 220. Then, the high-sensitivity digital signal Ha is sent to the table storage area 230 and undergoes gray-scale correction based on the LUT for gray-scale correction of a high-sensitivity digital signal to generate a gray-scale-converted high-sensitivity digital signal Hb (step S2). The generated high-sensitivity digital signal Hb is temporarily stored into the memory 90 via the selector 250.

Next, the table overwriting section 240 reads the LUT for gray-scale correction of a low-sensitivity digital signal from the memory 90 and writes the LUT for gray-scale correction of a low-sensitivity digital signal into the table storage area 230 (step S3). The low-sensitivity digital signal La is sent to the multiplier 220 via the selector 210 and multiplied by the same gain correction factor as that for the high-sensitivity digital signal Ha to undergo gain adjustment in the multiplier 220. Then, the low-sensitivity digital signal La is sent to the table storage area 230 and undergoes gray-scale correction based on the LUT for gray-scale correction of a low-sensitivity digital signal to generate a gray-scale-converted high-sensitivity digital signal Hb (step S4). The generated low-sensitivity digital signal Lb is temporarily stored into the memory 90 via the selector 250.

When gray-scale correction is complete, the table overwriting section 240 reads the weighting LUT for signal synthesis previously generated and stored into the memory 90 by the controller 80, and writes the weighting LUT for signal synthesis into the table storage area 230 (step S5). When the weighting LUT for signal synthesis is set to the table storage area, the high-sensitivity digital signal Hb and the low-sensitivity digital signal Lb are sequentially input to the selector 210. The high-sensitivity digital signal Hb is sent to the table storage area 230 and the multiplier 260 via the selector 210. The low-sensitivity digital signal Lb is sent to the multiplier 270 via the selector 210.

From the tables storage area 230, the weighting factors h_gain and l_gain stored in the weighting LUT for signal synthesis are output in accordance with the level of the input high-sensitivity digital signal Hb input, and sent to the multipliers 260, 270 respectively. In the multiplier 260, the high-sensitivity digital signal Hb is multiplied by h_gain for a weighting process. In the multiplier 270, the low-sensitivity digital signal Lb is multiplied by l_gain for a weighting process. The values of the digital signals output from the multipliers 260 and 270 are summed up in the adder 280 to generate a synthesis signal S. The generated synthesis signal S is checked for an overflow by a limiter 290, then output as a final synthesis signal S (step S6).

Then, the synthesis signal S undergoes desired processing in the YC processor circuit 56 to generate non-compressed image data to terminate generation of image data (step S7).

As mentioned hereinabove, according to this embodiment, processing in the gain adjustment section 53, the gray-scale correcting section 541 and the synthesizer 55 is sequentially performed by the optimum synthesis circuit 52 shown in FIG. 4. The optimum synthesis circuit 52 does not perform complicated arithmetic operation of functions but uses LUTs to perform various processes. This reduces computation load on the optimum synthesis circuit 52 due to complicated arithmetic operation of functions s as to ensure speedy processing.

The LUTs used for various processes are previously generated by the external controller 80 capable of high-speed arithmetic operation. This takes the computation load to generate LUTs off the optimum-synthesis circuit 52. Thus it is possible to smoothly perform other arithmetic operations in the optimum synthesis circuit 52 thereby boosting various processes.

The LUTs used for various processes are stored into the table storage area 230 so that an LUT necessary for each arithmetic operation overwrites the preceding LUT in case an arithmetic operation using an LUT takes place. Thus, it is not necessary to previously provide a plurality of table storage areas for storing LUTs in the optimum synthesis circuit 52. In other words, it is possible to perform various processes without reserving memory areas for simultaneously storing a plurality of LUTs in the optimum synthesis circuit 52. In general, to store matrix-format LUTs corresponding to 12-bit and 8-bit gray-scale data into a circuit, the space of the memory area is increased when the circuit comes in a chip. This makes it difficult to downsize the chip and leads to increased costs. According to this embodiment, it is not necessary to provide memory areas corresponding to a plurality of LUTs in the optimum synthesis circuit 52. This decreases the memory area and the chip size thereby reducing the overall costs.

While description has been made on a digital camera in this embodiment, this method is not limited thereto but this method may be applied to imaging apparatus capable of taking moving pictures such as a digital video camera.

While description has been made on an image pickup device called a Double Honeycomb Super CCD in this embodiment, the inventive signal processor circuit may be applied to various types of imaging apparatus capable of acquiring a high-sensitivity signal and a low-sensitivity signal.

According to the invention, the data written into a table storage area is overwritten in correspondence to a process. Thus, it is not necessary to previously provide a plurality of table storage areas for storing LUTs corresponding to a plurality of processes. It is necessary to provide a storage area for LUTs alone having a maximum data amount as data capacity of a table storage area. This makes it possible to acquire a signal synthesis method which saves the size of the data area of a table storage area and a low-cost signal synthesis circuit.

What is claimed is:

1. A signal processing method comprising:
an overwriting step of overwriting a LUT written into a table storage area with another LUT, in accordance with a content of each of a plurality of processes executed to a first signal or a second signal; and
a synthesizing step of performing a process corresponding to a content of the another LUT for the first signal or the second signal each time the LUT in the table storage area is overwritten and synthesizing the processed first signal and the second processed signal, wherein the synthesizing step comprises:
a step of writing a first LUT for gray-scale correction of the first signal into the table storage area;
a step of performing gray-scale correction on the first signal by using the first LUT for gray-scale correction written into the table storage area;
a step of overwriting the table storage area where the first LUT for gray-scale correction is overwritten with a second LUT for gray-scale correction of the second signal;
a step of performing gray-scale correction on the second signal by using the second LUT for gray-scale correction written into the table storage area;
a step of overwriting the table storage area where the second LUT for gray-scale correction is overwritten with a weighting LUT for signal synthesis; and
a step of synthesizing the first signal and the second signal by using the weighting LUT for signal synthesis written into the table storage area.

* * * * *